UNITED STATES PATENT OFFICE.

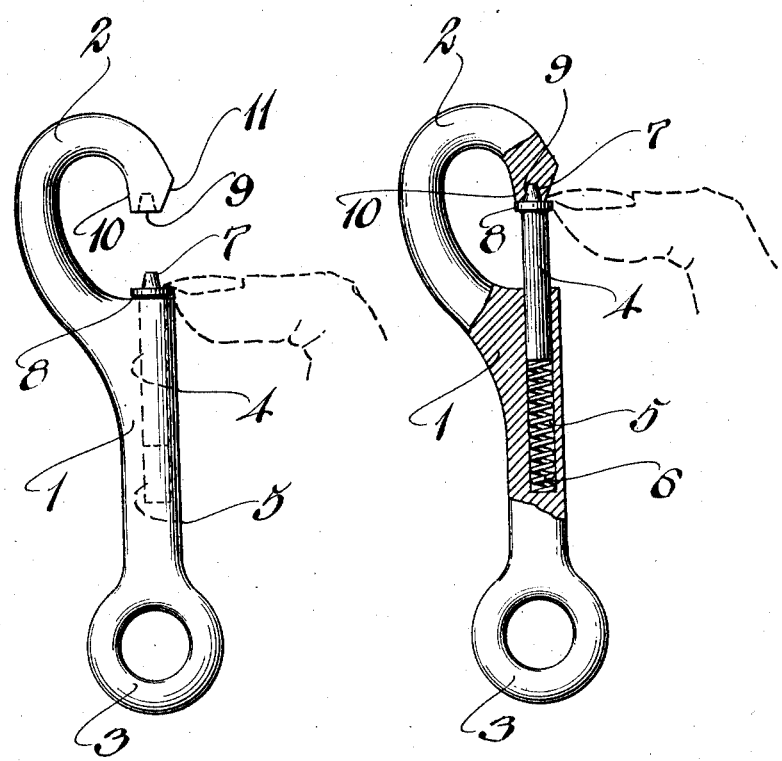

KARL F. GERHARD, OF HATTON, WASHINGTON.

SNAP-HOOK.

1,388,557. Specification of Letters Patent. Patented Aug. 23, 1921.

Application filed August 23, 1920. Serial No. 405,457.

*To all whom it may concern:*

Be it known that I, KARL F. GERHARD, a citizen of the United States, residing at Hatton, in Adams county and State of Washington, have invented certain new and useful Improvements in Snap-Hooks, of which the following is a specification.

My present invention relates to improvements in snap hooks as adapted for use in connection with harness, and for similar purposes. The primary object of the invention is the provision of a hook of this type so constructed and arranged as to eliminate the possibility of the unfastening or detachment of the hook due to frictional engagement therewith of parts of the harness, thus avoiding danger of accidents, and to furnish an effective device for performing its functions which may be opened by direct and positive thumb or finger pressure when required.

To this end the invention involves, in combination, a novel form of latch pin, urged to locked position by a spring and having means co-acting with the hook portion of the device whereby the latch pin may be released by thumb pressure, all as will be hereinafter pointed out and claimed.

In the accompanying drawings I have illustrated one complete example of the physical embodiment of my invention wherein the parts are so combined and arranged as to show one of the best modes I have thus far devised for the practical application of the principles of my invention.

Figure 1 is a view in elevation, showing a snap hook embodying my invention, with the latch pin in open position.

Fig. 2 is a view of the snap hook, shown partly in section, and in closed position.

In the preferred form of my invention as depicted in the drawings I employ the well known type of snap hook adapted for harness use having the shank portion 1, the hook 2, and pivoted attaching ring 3.

The latch pin 4 is preferably a round bar axially alined with the shank of the hook, and retained in the socket or barrel 5 of the shank. A coiled spring 6 is seated in the socket or barrel beneath the latch pin and has a tendency to urge the pin at all times from the barrel.

In adapting my invention for use with the common type of hook, the pin is provided with a locking point 7, slightly tapered and alined with the body of the pin and projected beyond the enlarged head 8 fashioned integral with the pin.

In the end of the hook is provided a socket 9, alined with the barrel of the shank, and adapted to receive the pin point 7, as shown in Fig. 2, and it will be obvious that the spring 6 holds the pin point in its socket to lock the hook.

The annular head 8 of the pin and the diameter of the socket-end 10 of the hook, it will be observed, are such as to provide a smooth and flush joint with a continuous line inside the hook crossing the joint between the head and hook, thus eliminating any projections or obstructions within the hook that might be likely to encounter any portion of the inclosed harness and result in withdrawing the pin point from its socket.

To facilitate the release of the latch pin from the socket for detaching the hook, I provide the hook end 10 with a beveled or cut-away face 11 at the outer side of the hook end. This beveled face provides a guide for the thumb, as in Fig. 2, and leaves exposed a portion of one of the shoulders of the pin head, against which the thumb may be pressed to withdraw the pin from its socket against the tension of the spring. Regardless of the position of the pin, which is free to turn in its barrel, the circular head presents at all times on the outer side of the hook, a shoulder for pressure from the thumb, for withdrawing the pin. The construction of the socket-end of the hook and the circular head of the pin of complementary peripheral outline, (except for the beveled face of the hook end) secures a close contact between the adjoining face of the hook and the face of the shoulder or head of the pin, and the tension of the spring is sufficient to hold these two faces in close contact. While the smooth continuous line inside the hook is carried across the head, it will be apparent that the shoulder of the head opposite the pin point presents a contact surface against which the inclosed element of the harness may frictionally engage, with the result that the pin, in addition to its tension spring, is thus held in locked position.

Having thus fully described my inven- tion, what I claim as new and desire to secure by Letters Patent is—

The combination in a snap hook with its hollow shank, spring projected pin, and hook-end having a socket to receive the pin point, of an annular head on the pin larger than the socket and of the same peripheral outline as the hook-end and complementary thereto to form a continuous surface with the inner portion of the hook-end, and said hook end having a beveled outer face to expose a portion of the pin head for thumb pressure, for the purpose described.

In testimony whereof I affix my signature.

KARL F. GERHARD.